United States Patent [19]

Praserthdam

[11] Patent Number: 5,849,662
[45] Date of Patent: Dec. 15, 1998

[54] CATALYST COMPRISING OF ELEMENT FROM GROUP 1B AND VIIIB ACTIVATED BY OXYGEN OR OXYGEN CONTAINING COMPOUND

[75] Inventor: Piyasan Praserthdam, Bangkok, Thailand

[73] Assignee: Chulalongkorn University, Bangkok, Thailand

[21] Appl. No.: 487,904

[22] Filed: Jun. 7, 1995

Related U.S. Application Data

[63] Continuation of Ser. No. 140,775, Oct. 21, 1993.
[51] Int. Cl.$^6$ ............................. B01J 23/58; B01J 23/38
[52] U.S. Cl. ..................... 502/330; 502/184; 502/245; 502/318; 502/331; 502/344; 502/348; 502/514
[58] Field of Search ................................. 502/184, 245, 502/318, 330, 331, 344, 345, 348, 514

[56] References Cited

U.S. PATENT DOCUMENTS

| | | | |
|---|---|---|---|
| 3,449,063 | 6/1969 | Griffing et al. | 502/331 |
| 3,676,516 | 7/1972 | Haskell | 502/345 |
| 4,714,689 | 12/1987 | Strammahh et al. | 502/54 |
| 5,124,295 | 6/1992 | Hebestt et al. | 502/388 |

*Primary Examiner*—Glenn A. Caldarola
*Assistant Examiner*—Nadine Preisch
*Attorney, Agent, or Firm*—Ladas & Parry

[57] ABSTRACT

The present invention relates to catalysts which comprise element(s) of group IB, and element(s) and/or compound(s) of the transition metals, with or without support. The catalyst are activated with $O_2$ and/or oxygen containing compound (s) or the mixture of oxygen and/or oxygen containing compound(s) with inert gas(es) to make them more active.

16 Claims, 4 Drawing Sheets

5,849,662

CATALYST COMPRISING OF ELEMENT FROM GROUP 1B AND VIIIB ACTIVATED BY OXYGEN OR OXYGEN CONTAINING COMPOUND

This is a continuation of application Ser. No. 08/140,775 filed on 21 Oct. 1993, now abandoned.

BACKGROUND OF THE INVENTION

1. Field of the Invention

The invention relates to activated catalysts comprising group IB element(s), together with transition metal(s) or compound(s) of transition metal(s), with or without support (s), to a process for preparing said catalysts and to their use in a variety of chemical reactions such as oxidation and reduction reactions.

2. Description of the Related Art

British Publication 1596959, LEUNA-WERKE, dated Sep. 3, 1981 describes Pd catalysts, having Cu, Ni and Ag as promoters. The catalyst was used for the selective hydrogenation of acetylene in ethylene mixture. It was found that stability of the catalyst was improved and ethylene loss was decreased.

U.S. Pat. No. 4,797,382, Waldo De Thomas et al., Jan. 10, 1989, discloses a novel supported catalyst comprising (a) copper (b) a metal having an atomic weight greater than 100, selected from groups VIIB and VIII of the Periodic Table and (c) an alkaline metal in a weight ratio of about 8–40:0.05–5:1.5–10. The catalyst was used for the hydrogenation of butyrolactone to 1,4-butanediol.

U.S. Pat. No. 4,251,394, Allan E. Barnett et al., Feb. 17, 1981, describes a copper promoted massive nickel catalyst which is capable of having a reduced nickel surface area ranging from about 55 to about 100 $m^2/g$, after reduction at 400° C., wherein the amount of copper in the catalyst ranges from about 2 wt % to about 10 wt % and the amount of nickel ranges from about 25 wt % to about 50 wt %. The catalyst is activated with a gaseous reductant at temperature ranging from 75° C. to 400° C. before use.

Hungarian Publication T51932, BUDAPESTI MUSZAKI EGYETE, Jun. 28, 1990, discloses a Pd-Cu catalyst comprising 0.1–20% Pd or 0.1–20 atom % Cu in relation to Pd. Preparation is carried out in a reducing atmosphere between 0° C. and the boiling point of the composite in organic acid (pH less than 5) and a polar solvent.

German Publication 2220617, METALLGES AG Co., Apr. 27, 1972, discloses a catalyst containing Cu as main components, together with Zn, Mn, Mg, Ca, Al, Ti and/or Cr. These metals are present initially in the catalyst in the form of oxides or carbonates, and the catalyst is treated with $H_2$ at 200° C. before use.

Japanese Publication 57042653, ASAHI CHEMICAL INDUSTRY, Mar. 10, 1982, discloses a process for the preparation of dicarboxylic acid diester, comprises reacting an unsaturated hydrocarbon with carbon monoxide and alcohol with a gas containing molecular oxygen under a pressure of 5–300 $kg/cm^2$ at 20°–200° C. in the presence of a catalyst prepared by adding a solid base compound to a Pt group metal and iron and/or a halogenated copper compound. In this patent, a gas containing molecular oxygen acts as a feed.

Russian 226612, ZAPOROZHE KREMNIIPO Co., May 28, 1976, discloses a process for the preparation of more active silicon copper contact catalyst, for the synthesis of organochlorosilanes, which involves dispersing a fusion of Cu and Si in e.g. air, technical $N_2$, steam, $O_2$ or their mixture to give the required oxidation. This patent did not use $O_2$ and/or oxygen containing compounds to activate the catalyst before use.

Japanese 93025871, UBE INDUSTRIES, Apr. 14, 1993 describes a method for oxidative coupling of phthalic acid ester in the presence of $10^{-5}$–$10^{-2}$ molar times Pd salt(s) to phathalate, 0.5–10 molar times copper salt(s) to Pd salt(s) and molecular oxygen at 150°–300° C. with supplying beta-diketones continuously or discontinuously. In this patent, a molecular oxygen acts as a feed.

SUMMARY OF THE INVENTION

The present invention relates to catalysts comprising group IB element(s), together with transition metal(s) or compound(s) of transition metal(s), with or without support (s). The catalysts are activated with oxygen and/or oxygen containing compound(s) or the mixture of oxygen and/or oxygen containing compound(s) with inert gas(es).

DESCRIPTION OF THE PREFERRED EMBODIMENTS

Figure 1:
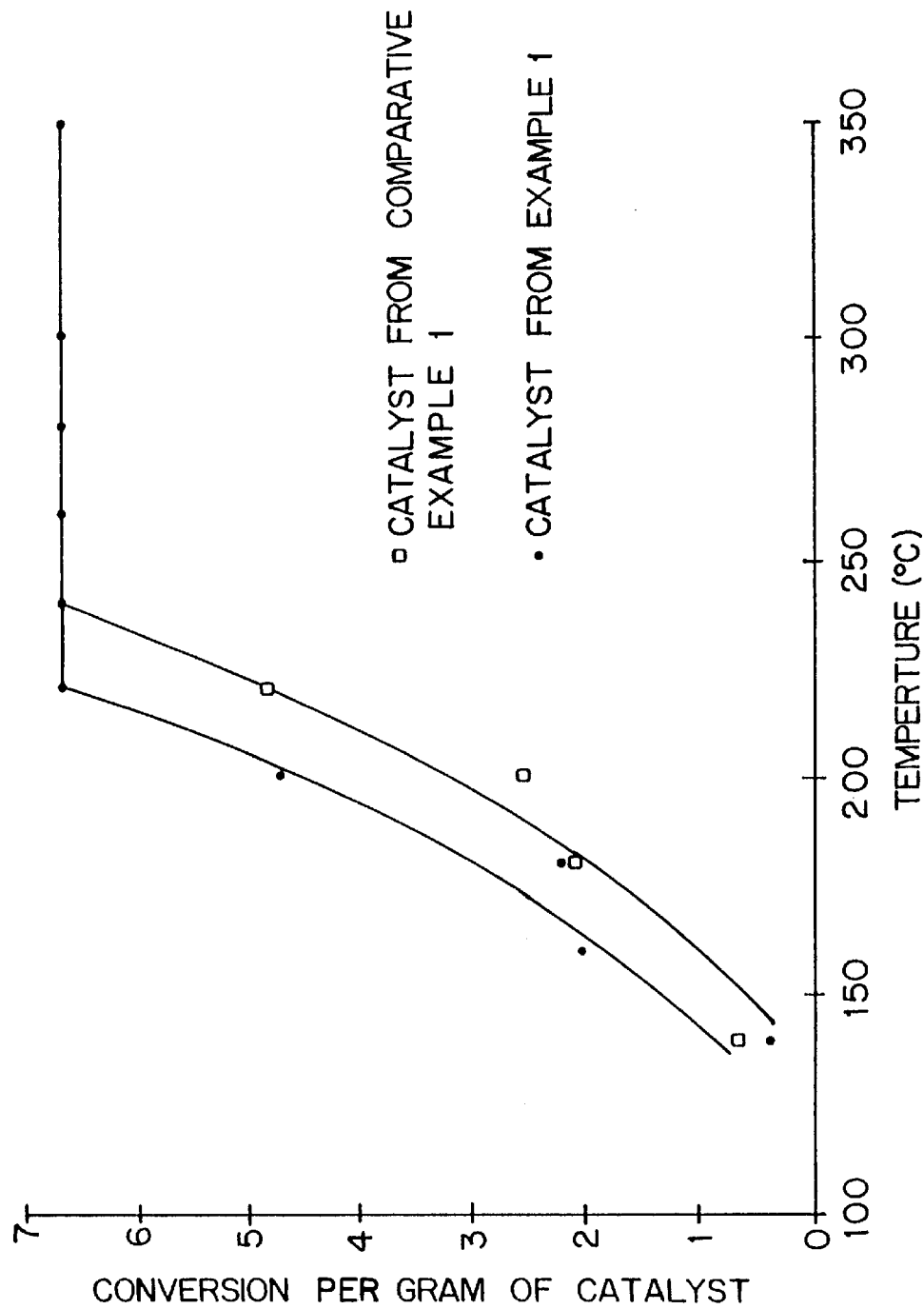
FIG. 1 is a graphical illustration on an embodiment of the invention in which a catalyst of the invention is used for CO oxidation into $CO_2$ in comparison with use of a comparative catalyst.

The above prior art does not disclose a method for activating catalyst by using oxygen and/or oxygen containing compounds. However the chemical industry still needs more active catalysts.

Most surprisingly, it has now been found that $O_2$ and/or oxygen containing compounds can activate the catalysts which comprise elements of group IB, together with element (s) and/or compound(s) of the transition metals of the periodic table of elements, with or without support.

The object of this invention is to provide novel catalysts that are more active than the catalysts of the prior art.

Catalyst preparation is a very important step to produce a more active catalyst. In general the chemical industry requires more active catalysts with fewer side-reactions. These requirements depend on catalyst preparation technique. Normally, catalyst preparation still is an art. At present, with modern analytical and characterization equipments, catalyst preparations are approaching a science.

There are many methods for industrial preparation of catalysts, depending on the reaction to be used. The general methods for catalyst preparation are as follows:

1. Impregnation

Impregnation is the easiest method, and the most popular method. Specified supports are put into solution of salt of active species. Salts of active species disperse into supports. The impregnated support is calcined at high temperature to remove unwanted materials.

Supports commonly used in the industry are alumina, silica, kaolin and active carbon. Impregnation can be achieved by wet or dry methods.

2. Coprecipitation

This method has more advantages than Impregnation since more active species can be put into the catalysts. The method comprises precipitating a salt of an active species and a salt of a support from a mixture by using a precipitating agent such as alkali or carbonate substances. The more preferable salt is $Na_2CO_3$ or $NaHCO_3$. The salt mixture is calcined at high temperature to remove unwanted materials. The pH, rate of mixing and rate of adding the precipitating agent are parameters which control catalyst structure.

Catalysts with active species in oxide form are treated as follows: washing, drying, forming and reduction. Besides active species, promoters and modifiers can optionally be added into the catalysts.

Promoter is a substance that promotes the activity and/or selectivity and/or the stability of catalysts. An amount of promoter depends on an amount of active species. Furthermore, some promoter can act as active species.

Modifier is a substance used for improving the chemical and physical properties of catalysts, for example, a substance that can reduce acidity of support or a substance that assists the formation of catalyst.

Catalysts according to the present invention comprise group IB element(s) of the periodic table of elements, together with element(s) and/or compound(s) of the transition metal(s) with or without support(s), or modifier(s). The catalysts can be activated using $O_2$ and/or oxygen containing compound(s) or the mixture of oxygen and/or oxygen containing compound(s) with inert gas(es) before use.

Group IB elements according to the present invention are Cu, Ag and Au, most preferably Cu.

Transition metal(s) according to the present invention are Group IIB, IIIB, IVB, VB, VIB, VIIB and VIIIB. More preferred transition metal(s) according to the present invention are group IIB, IVB, VIB and VIIIB. The more preferred transition metal(s) according to the present invention are Group IIB, VIB and VIIIB. The compound(s) of these transition metal(s) are in the forms of oxide(s) and salt(s). More preferred transition element(s) are Zn, Ce, Zr, Hf, V, Cr, Mn, Re, Fe, Co, Ni, Pd and Pt.

The proportions between the IB element(s) and the transition element(s) normally depends on type of catalyst that are suitable to specific reactions. For example, copper chromite catalyst, the composition by weight of Cu and Cr are between 33–40% Cu and 26–31% Cr, MeOH synthesis catalyst, the atomic ratio of Cu:Zn=1:19 to 3:7 and selective acetylene hydrogenation catalyst, the composition by weight of Pd and Ag are between 0.01–0.05% Pd and 0.04–0.2% Ag etc.

Oxygen containing compound(s) according to the present invention, include for example, oxides of elements of groups IVA and VA, for example, CO, $CO_2$, $N_2O$, NO and $NO_2$. The preferable oxygen containing compound is $N_2O$.

The catalysts according to the present invention, can be prepared with or without support. They may be prepared by impregnation or co-precipitation as mentioned above. After that, the catalyst can be reduced by a reducing agent at a suitable temperature and time.

Finally the catalyst is treated with $O_2$ and/or oxygen containing compound(s) or the mixture of oxygen and/or oxygen containing compound(s) with inert gas(es) in a suitable amount and at a suitable temperature to provide a more active catalyst before use.

Reducing agents for use in the catalyst preparation according to the present invention include for example, $H_2$ or the mixture of $H_2$ and inert gas(es). Preferred temperature ranges for reducing the catalyst are from about 10°–1,000° C. Preferred time for reducing the catalyst is from about 0.01–100 hours.

Oxygen containing compound(s) for use in the catalyst preparation according to the present invention, include, for example, oxides of elements of groups IVA and VA, such as CO, $CO_2$, $N_2O$, NO, and $NO_2$, and the most preferred oxygen containing compound(s) is $N_2O$. The amount of $O_2$ and/or oxygen containing compound(s) used in the catalyst preparation according to the present invention, is calculated from the atomic ratio of oxygen in $O_2$ and/or in oxygen containing compounds and the element of group IB, in the catalyst according to the present invention.

The preferred ratio of atomic oxygen in $O_2$ and/or in oxygen containing compound(s) to the element(s) of group IB, in the catalyst is in the range of 0.0001–1000:1 in parts by atom, preferably 0.001–100:1 in parts by atom and most preferably in the range of 0.1–1.0:1 in parts by atom. The preferred temperature range of the catalyst according to the present invention, during the passing of $O_2$ and/or oxygen containing compound(s) is from about 0°–500° C., most preferably in the range of from about 10°–100° C.

Oxygen and/or oxygen containing compound(s) of the present invention can be added to the reduced catalyst in one portion or can be divided and added in several small portions.

The catalyst according to the present invention, can be used in various kinds of chemical reactions, for example, oxidation, reduction etc.

Oxidation reactions include, for example, complete or partial oxidation reactions, oxidative coupling reactions and dehydrogenation reactions.

The complete or partial oxidation reactions include, for example, CO oxidation reaction, combustion of hydrocarbon, preparation of hydroxy and alkoxy aromatic aldehyde by oxidizing derivatives of phenyl glycolic acid, purification of exhaust gas from automobiles, preparation of glyoxal by oxidizing ethylene glycol, preparation of ketone (s) by oxidizing unsaturated olefinic compounds with $O_2$, preparation of beta-acryloxycarboxylic anhydride by using carboxylic anhydride, olefin, CO and $O_2$, and reaction of unsaturated hydrocarbons with CO or alcohol with oxygen containing gas.

Oxidative coupling reactions include, for example, preparation of biphenyl tetracarboxylic acid ester by oxidative coupling of phthalic acid ester, preparation of glycolaldehyde by using ethylene glycol and $O_2$.

Dehydrogenation reactions include, for example, dehydrogenation of light paraffin, etc.

Reduction reactions include, for example, hydrogenation reaction and selective hydrogenation reaction.

Hydrogenation reactions include, for example, preparation of 2-ethylhexanol from 2-ethylhexenal, preparation of diols from lactones, hydrogenation of acetylene and alcohols, preparation of ether compounds from iodoaromatic compounds with alcohol and reducing agents, preparation of aliphatic, primary amines by liquid phase reaction of straight chain alcohols in $NH_3$ $H_2$, preparation of tetramethyl-cycloheptane by hydrogenation of hydroxymethyl-carene.

Selective hydrogenation reactions include, for example, selective hydrogenation of acetylene in ethylene mixtures, selective hydrogenation of highly unsaturated hydrocarbon without isomerization.

Now, the present invention will be described with reference to Examples. However, it should be understood that the present invention is by no means restricted to such specific Examples.

EXAMPLE

Example 1

A catalyst according to the present invention was prepared by using 9.17 g of 40/60 mesh support with pore volume 1.0 cc/g. After the support was cleaned and dried, $H_2PtCl_6.6H_2O$ with total Pt content of 0.03 g was added dropwise to the alumina support. The impregnated support was calcined by air at 500° C. for 4 hrs., air space velocity was 1,200 $hr^{-1}$. The impregnated support was allowed to cool to room temperature. $Cu(NO_3)_2.3H_2O$ with total Cu content of 0.8 g was added dropwise to the impregnated support. Holding the Pt and Cu impregnated support for 6 hrs., and then dried it at 110° C. for 24 hrs. Reduced the Pt and Cu impregnated support with 10% $H_2$ in $N_2$ at space velocity 2,000 $hr^{-1}$, at 500° C. for 7 hrs. 200 cc of $N_2O$ was passed into the impregnated support at 90° C. to obtain more active 0.3% Pt-8% Cu catalyst.

Example 2

0.15 g of the catalyst from example 1 was put into a quartz reactor. Feed containing 1.2% CO, 3000 ppm of $C_3H_8$, 10% $O_2$ balanced with $N_2$ was passed through the catalyst, with a feed rate of the gas mixture of about 700 cc/min, and reaction temperature in the range 150°–600° C. The result is shown in FIG. 1.

Example 3

Figure 2:
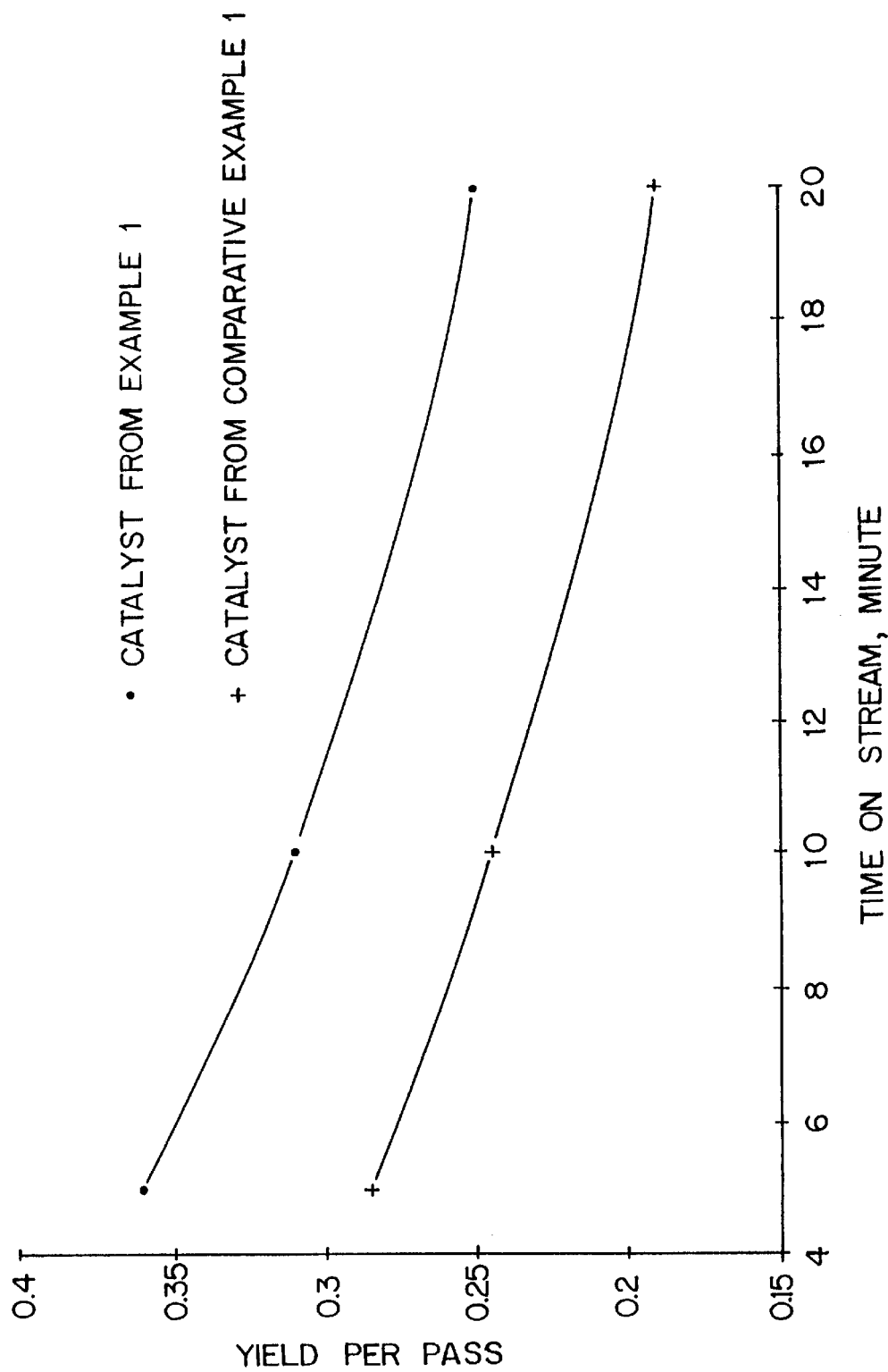
FIG. 2 is a graphical illustration of an embodiment of the invention in which a catalyst of the invention is used for propane dehydrogenation in comparison with use of a comparative catalyst.

0.1 g of catalyst from example 1 was put into a quartz reactor. Feed containing 20% $C_3H_8$ balanced with $N_2$ and $H_2$ was passed through the reactor at the molar ratio of $H_2$:HC= 1.0. Total feed rate of the gas mixture was 100 cc/min. Reaction temperature was maintained at 650° C. The result is shown in FIG. 2.

Example 4

Figure 3:
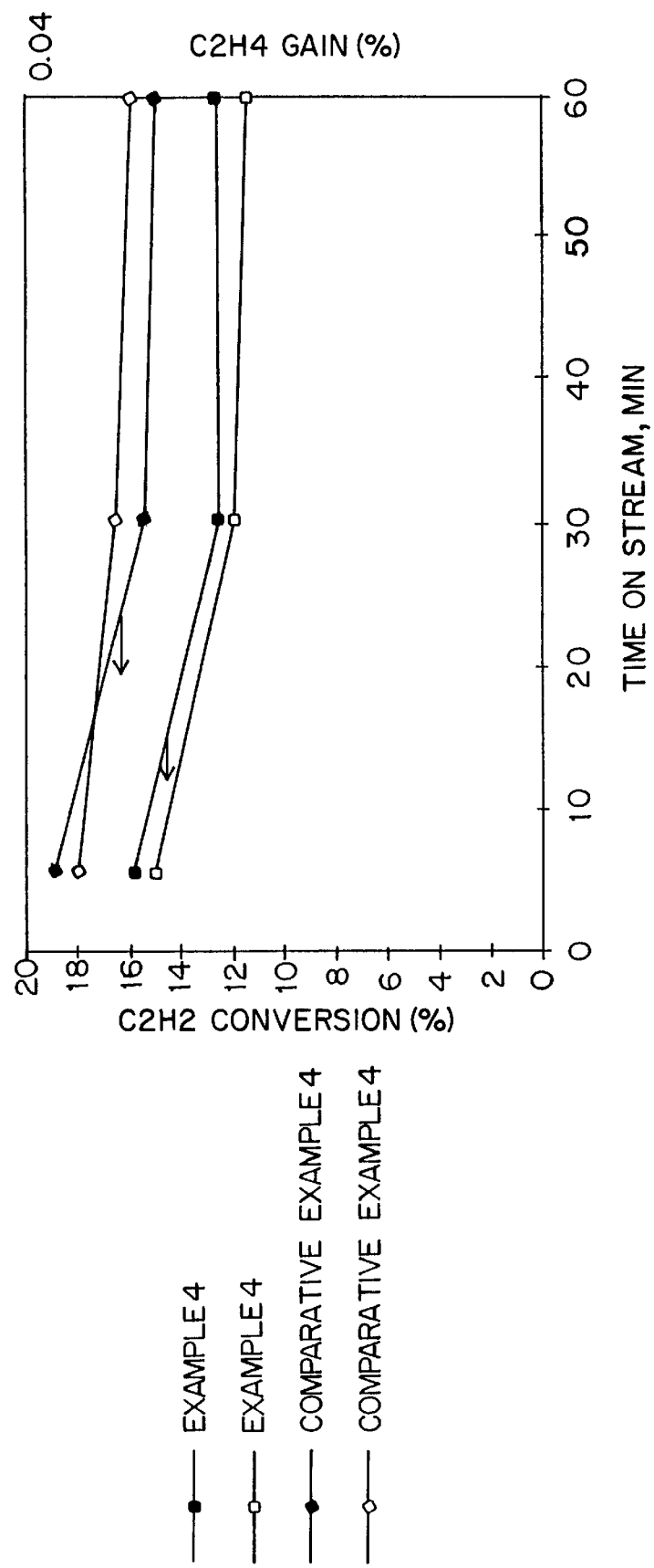
FIG. 3 is a graphical illustration of an embodiment of the invention in which a catalyst of the invention, activated by $N_2O$ is used for selective actylene hydrogenation in comparison with use of a comparative catalyst.

0.2 g of a commercial selective acetylene hydrogenation catalyst which has composition by weight of Pd and Ag between 0.01–0.05% Pd and 0.04–0.2%. Ag was put into a quartz reactor. The catalyst was reduced by pure $H_2$ at 100° C. with a flow rate of 100 cc/min for 2 hr., and then cooled down by Ar to 90° C. 20 $\mu l$ of $N_2O$ was injected into the reactor, and then cooled down to 60° C. by Ar. Feed containing 0.21% $C_2H_2$, 0.7% $H_2$ balanced with $C_2H_4$ was passed through the reactor with a feedrate of 30 cc/min. The result is shown in FIG. 3.

Example 5

Figure 4:
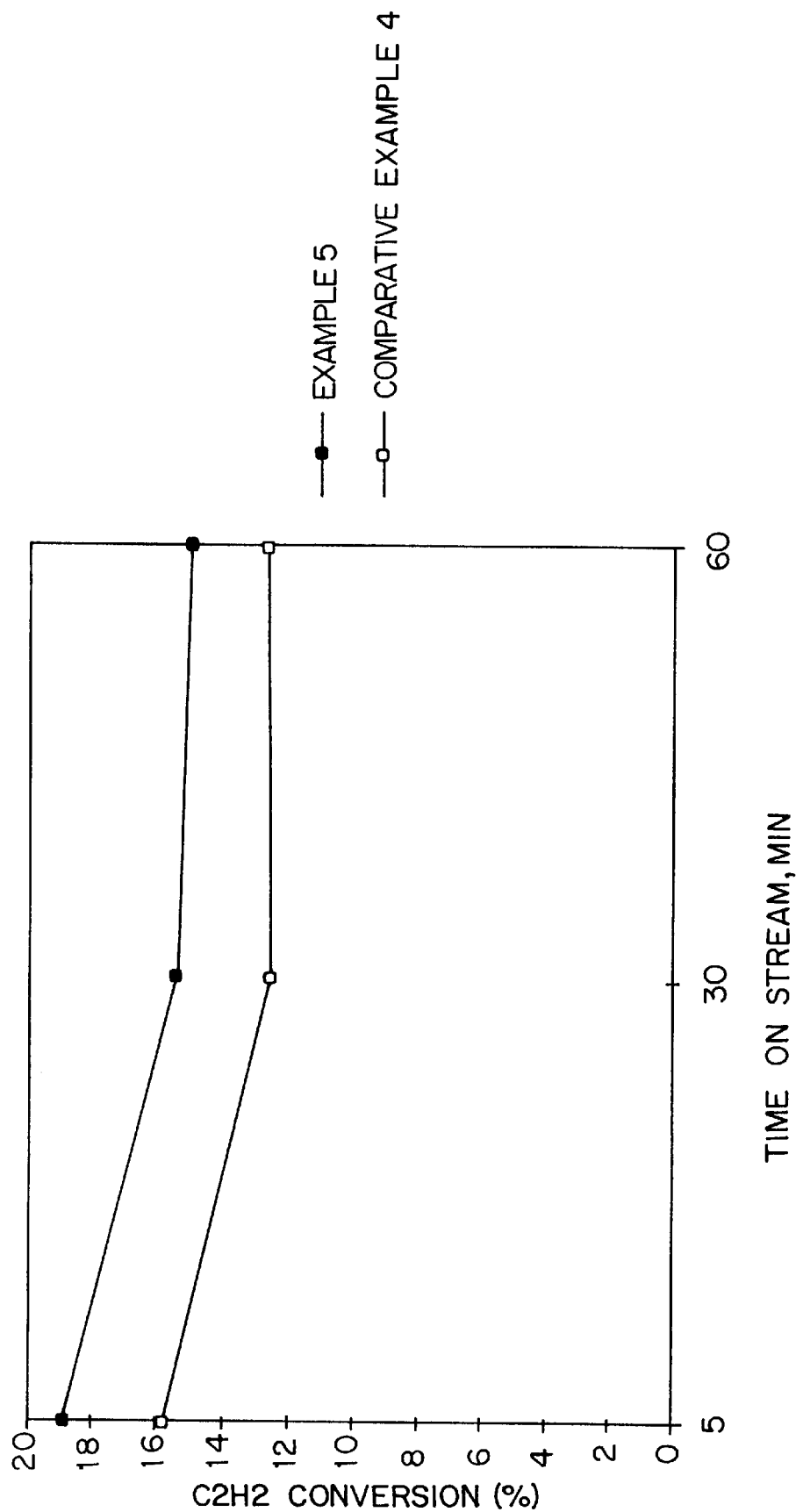
FIG. 4 is a graphical illustration of an embodiment of the invention in which another catalyst of the invention, activated by $O_2$ is used for selective acetylene hydrogenation in comparison with use of a comparative catalyst.

The procedure of example 4 was repeated, except that 10 $\mu l$ of $O_2$ was used instead of $N_2O$. The result is shown in FIG. 4.

Comparative Example 1

A catalyst was prepared following the same procedure as example 1 except no $N_2O$ was used.

Comparative Example 2

The procedure of example 2 was repeated except the catalyst of the comparative example 1 was used instead of the catalyst of the present invention. The result is shown in FIG. 1.

Comparative Example 3

The procedure of example 3 was repeated, except the catalyst of the comparative example 1 was used instead of the catalyst of the present invention. The result is shown in FIG. 2.

Comparative Example 4

The procedure of example 4 was repeated, except that no $N_2O$ was used. The results are shown in FIGS. 3 and 4.

From the above examples and comparative examples, it was demonstrated clearly that the catalyst which was activated with $O_2$ or oxygen containing compound(s) according to the process of the present invention provided much higher activities in oxidation, dehydrogenation and selective hydrogenation reactions.

I claim:

1. A catalyst comprising element(s) of group IB, and element(s) and/or compound(s) of the group VIIIB element (s), with or without support or modifier(s), said catalyst being reduced with a reducing agent at an effective temperature for an effective period of time and then being activated with a very small amount of oxygen and/or oxygen containing compound(s) or the mixture of oxygen and/or oxygen containing compound(s) with inert gas(es), at a low temperature, to make it at least 10 percent more active, wherein the ratio of $O_2$ and/or oxygen containing compound (s) calculated as atomic ratio of oxygen in $O_2$ and/or in the oxygen containing compound(s) to the element(s) of group IB in the catalyst is in the range of 0.0001–1000:1 in parts by atoms, and wherein the temperature while $O_2$ and/or the oxygen containing compound(s) or the mixture of oxygen and/or oxygen containing compound(s) with inert gas(es) is passed through the catalyst mixture is in the range of 0°–200° C., providing that when said element of group IB is Cu said catalyst being activated with $N_2O$.

2. The catalyst as claimed in claim 1, wherein said elements of group IB are Cu, Ag and Au.

3. The catalyst as claimed in claim 1, wherein said element of group IB is Cu.

4. The catalyst as claimed in claim 1, wherein the oxygen containing compound(s) are, oxides of elements of groups IVA, and VA.

5. The catalyst as claimed in claim 4, said compounds being one of CO, $N_2O$, NO and $NO_2$.

6. The catalyst as claimed in claim 1, wherein the oxygen containing compound is $N_2O$.

7. A process for the preparation of a catalyst, which process comprises the following steps:

(i) providing a catalyst mixture comprising element(s) of group IB, and element(s) and/or compound(s) of the group VIIIB element(s), with or without support, or modifier(s);

(ii) reducing said catalyst mixture with a reducing agent at an effective temperature for an effective period of time;

(iii) activating said catalysts mixture with a small effective amount of $O_2$ and/or oxygen containing compound (s) or the mixture of oxygen and/or oxygen containing compound(s) with inert gas(es) at an effective temperature; whereby the oxygen and/or oxygen containing compound(s) or the mixture of oxygen and/or oxygen containing compounds with inert gas(es) are added to the catalyst from (ii) in one portion or in several small portions, wherein the ratio of $O_2$ and/or oxygen and/or in the oxygen containing compound(s) calculated as atomic ratio of oxygen in $O_2$ and/or in the oxygen containing compound(s) to the element(s) of group IB in the catalyst is in the range of 0.0001–1000:1 in parts by atom, and wherein the temperature while $O_2$ and/or the oxygen containing compound(s) or the mixture of oxygen and/or oxygen containing compound(s) with inert gas(es) is passed through the catalyst mixture is in the range of 0°–200° C., providing that when said element of group IB is Cu said catalyst is activated with $N_2O$.

8. A process as claimed in claim 7, wherein the reducing agent is $H_2$ or a mixture of $H_2$ and inert gas(es).

9. A process as claimed in claim 7, wherein the reduction temperature is 10°–1,000° C.

10. A process as claimed in claim 7, wherein the reduction time is in the range of 0.01–10 hrs.

11. A process as claimed in claim 7, wherein the oxygen containing compound(s) are oxides of elements of groups IVA and VA.

12. A process as claimed in claim 11, the compounds being one of CO, $N_2O$, NO and $NO_2$.

13. A process as claimed in claim 7, wherein the oxygen compound is $N_2O$.

14. A process as claimed in claim 7, wherein the ratio of $O_2$ and/or oxygen containing compound(s) calculated as atomic ratio of oxygen in $O_2$ and/or in oxygen containing compound(s) to the element(s) of group IB in the catalyst is in the range of 0.001–100:1 in parts by atom.

15. A process as claimed in claim 7, wherein the ratio of $O_2$ and/or oxygen containing compound(s) calculated as atomic ratio of oxygen in $O_2$ and/or in the oxygen containing compound(s) to the element(s) of group IB in the catalyst is in the range of 0.1–1.0:1 in parts by atom.

16. A process as claimed in claim 7, wherein the temperature while $O_2$ and/or the oxygen containing compound (s) or the mixture of oxygen and/or oxygen containing compound(s) with inert gas(es) is passed through the catalyst mixture is in the range of 10°–100° C.

* * * * *